United States Patent
Devendran et al.

(10) Patent No.: US 7,783,849 B2
(45) Date of Patent: Aug. 24, 2010

(54) USING TRUSTED USER SPACE PAGES AS KERNEL DATA PAGES

(75) Inventors: Saravanan Devendran, Karnataka (IN); Avanish Kumar Ojha, Austin, TX (US); Muthulaxmi Srinivasan, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 681 days.

(21) Appl. No.: 11/620,449

(22) Filed: Jan. 5, 2007

(65) Prior Publication Data

US 2008/0168552 A1 Jul. 10, 2008

(51) Int. Cl.
*G06F 12/00* (2006.01)
*G06F 13/00* (2006.01)

(52) U.S. Cl. .................. 711/162; 711/100; 711/154; 711/170; 726/17

(58) Field of Classification Search ............... 711/100, 711/154, 161, 162, 170, 171, 172; 726/17
See application file for complete search history.

(56) References Cited

U.S. PATENT DOCUMENTS

| 7,178,165 | B2 * | 2/2007 | Abrams ................ 726/23 |
| 7,587,510 | B1 * | 9/2009 | Klager et al. .......... 709/232 |
| 2001/0044904 | A1 * | 11/2001 | Berg et al. ............ 713/201 |
| 2007/0199045 | A1 * | 8/2007 | Kime et al. ............ 726/2 |
| 2008/0133896 | A1 * | 6/2008 | Keniston .............. 712/227 |

OTHER PUBLICATIONS

Malony et al., "Performance technology for complex parallel and distributed systems", Jan. 2002, pp. 1-17 (http://www.cs.uoregon.edu/research/paracomp/papers/pdcp02/.

* cited by examiner

*Primary Examiner*—Tuan V. Thai
(74) *Attorney, Agent, or Firm*—Yee & Associates, P.C.; David A. Mims, Jr.

(57) ABSTRACT

A computer implemented method, apparatus, and computer program product for using trusted user space pages. A kernel accesses a set of trusted pages in user space. The set of trusted user space pages are read-only pages in user mode. Each trusted user space page in the set of trusted user space pages is set to be a readable and writeable page by the kernel. Data captured by the kernel is saved directly to a trusted user space page in the set of trusted user space pages.

19 Claims, 4 Drawing Sheets

USING TRUSTED USER SPACE PAGES AS KERNEL DATA PAGES

BACKGROUND OF THE INVENTION

1. Field of the Invention

The present invention is related generally to a data processing system and in particular to a method and apparatus for memory management. More particularly, the present invention is directed to a computer implemented method, apparatus, and computer usable program code for using trusted user space pages as kernel data pages.

2. Description of the Related Art

The operating system or kernel is an important component of most data processing systems. The kernel is responsible for managing system resources, such as processors, input/output (I/O) devices, and computer memory. Virtual memory is a memory addressing technique where the operating system presents noncontiguous memory to software as contiguous memory. In other words, virtual memory addresses are not tied to the computer's physical memory. Generally, a memory management unit (MMU) translates virtual memory addresses to physical addresses.

An operating system usually divides virtual memory into kernel space and user space. The kernel space is strictly used by the kernel. The user space is utilized by user applications and utilities. A user application cannot access kernel space directly. Moreover, if the kernel stores data in user space, the data can become corrupted or altered by user applications running in the user space.

Generally, when the kernel gathers data, such as data regarding process performance, the data is written in to the kernel space by the kernel. If a user application in the user space needs to utilize the data, the data is copied out from the kernel space into user space. This process of writing data first into the kernel space and then copying data to the user space consumes processor cycles and results in decreased computer system performance.

For example, profiling is used by processes to determine an approximate amount of processor time each process spends in each function. Profiling also identifies other functions that are called by a function and the frequency each of these functions are called. This information is typically presented in a call graph. A profiler analyzes profiling data gathered by the kernel to generate a profile and call graph for a given process. For example, in UNIX®, a profiler, gprof, can be run to analyze profiling data to generate a flat profile and a call graph for a process.

The process profiling algorithm has been extended to thread level profiling. A thread is a part of a process that can execute independently of other parts or threads of the process. In other words, a single process can have multiple threads. Processes having threads are sometimes referred to as threaded applications.

For threaded applications, thread level profiling is an option by which a user can obtain profiling data for each individual thread that is created for a given process. Thread level profiling can provide an approximate time that was spent in each function by individual threads. However, the problems inherent in process level profiling can also be seen in thread level profiling implementations.

When profiling data is collected for a thread and a different user thread needs to be scheduled, the profiling data is copied back to the user space. This copy-in and copy-out activity consumes processor cycles.

Memory usage for thread level profiling is also very high. For example, profiling data for each individual thread identifier (ID) stays in memory until the process exits. The memory consumed by a given thread for storing profiling information remains resident in memory even after the thread has exited. This profiling data for a given thread is only written out of memory to an output file when the parent process exits. This retention of a given thread's profiling data after the given thread has exited is an unnecessary consumption of memory, especially when the given thread's profiling data is ready to be written out but must remain resident in temporary memory until the parent process exits. The large memory requirements for profiling can limit the number of threads that can be created while a profiling feature is active.

Moreover, when a thread ID for a thread is reused on a subsequent thread, the existing profiling data in memory associated with the first thread is updated with the new profiling data for the subsequent thread. The actual profiling data for the first thread occurrence is lost because it is overwritten by the subsequent profiling data. This occurs due to the fact that thread profiling data is not written out to an output file until all threads have executed and the parent process exits.

In addition, thread level profiling data is temporarily stored in the user heap. The user heap can be corrupted by user applications. Therefore, thread profiling data in the user heap can become corrupted. In such a case, a user might unknowingly be using corrupted profiling data for an analysis or other purposes. Finally, all per-thread profiling data is written out at process exit. Therefore, a performance hit will occur during process exit due to the volume of profiling data that is written out at one time.

SUMMARY OF THE INVENTION

The illustrative embodiments provide a computer implemented method, apparatus, and computer usable program code for using trusted user space pages. In one embodiment, a set of trusted user space pages in a user space is accessed by the kernel. Each trusted user space page in the set of trusted user space pages is read-only in user mode. Each trusted user space page in the set of trusted user space pages is set to be a readable and writeable page by the kernel. Data captured by the kernel is saved directly to a trusted user space page.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
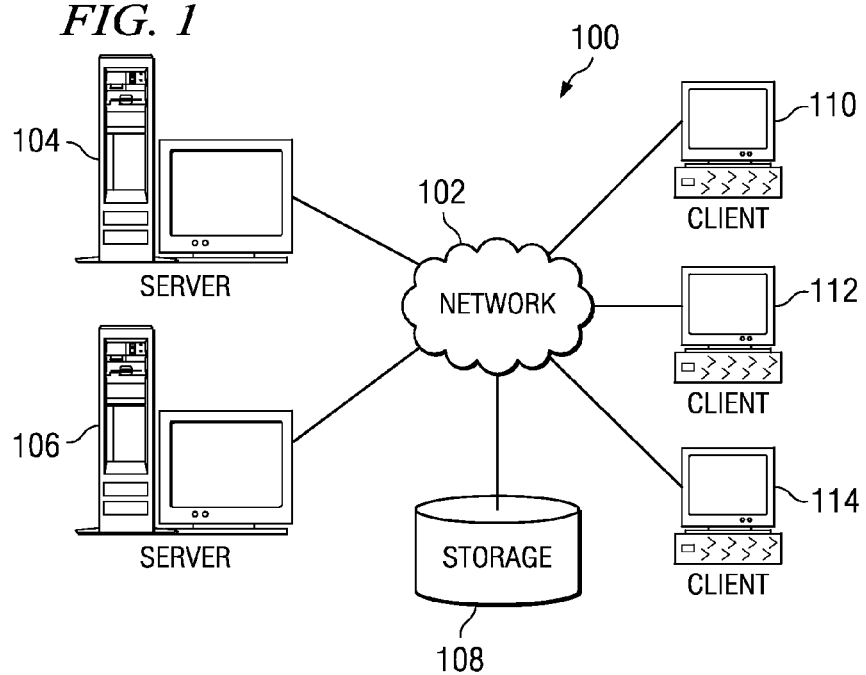
FIG. 1 is a pictorial representation of a network of data processing systems in which illustrative embodiments may be implemented.
Figure 2:
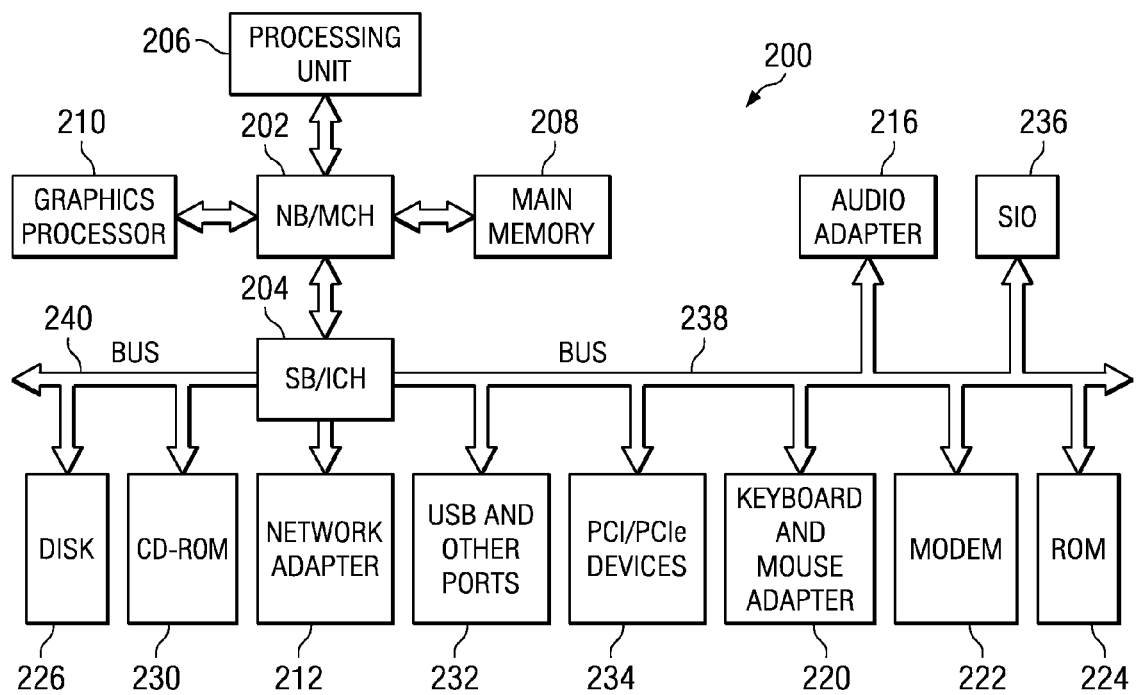
FIG. 2 is a block diagram of a data processing system in which illustrative embodiments may be implemented.

With reference now to the figures and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

With reference now to the figures, FIG. 1 depicts a pictorial representation of a network of data processing systems in which illustrative embodiments may be implemented. Network data processing system 100 is a network of computers in which embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. These clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for different embodiments.

With reference now to FIG. 2, a block diagram of a data processing system is shown in which illustrative embodiments may be implemented. Data processing system 200 is an example of a computer, such as server 104 or client 110 in FIG. 1, in which computer usable code or instructions implementing the processes may be located for the illustrative embodiments.

In the depicted example, data processing system 200 employs a hub architecture including a north bridge and memory controller hub (MCH) 202 and a south bridge and input/output (I/O) controller hub (ICH) 204. Processing unit 206, main memory 208, and graphics processor 210 are coupled to north bridge and memory controller hub 202. Processing unit 206 may contain one or more processors and even may be implemented using one or more heterogeneous processor systems. Graphics processor 210 may be coupled to the MCH through an accelerated graphics port (AGP), for example.

In the depicted example, local area network (LAN) adapter 212 is coupled to south bridge and I/O controller hub 204 and audio adapter 216, keyboard and mouse adapter 220, modem 222, read only memory (ROM) 224, universal serial bus (USB) ports and other communications ports 232, and PCI/PCIe devices 234 are coupled to south bridge and I/O controller hub 204 through bus 238, and hard disk drive (HDD) 226 and CD-ROM drive 230 are coupled to south bridge and I/O controller hub 204 through bus 240. PCI/PCIe devices may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM drive 230 may use, for example, an integrated drive electronics (IDE) or serial advanced technology attachment (SATA) interface. A super I/O (SIO) device 236 may be coupled to south bridge and I/O controller hub 204.

An operating system runs on processing unit 206 and coordinates and provides control of various components within data processing system 200 in FIG. 2. The operating system may be a commercially available operating system such as Microsoft® Windows® XP (Microsoft and Windows are trademarks of Microsoft Corporation in the United States, other countries, or both). An object oriented programming system, such as the Java programming system, may run in conjunction with the operating system and provides calls to the operating system from Java programs or applications executing on data processing system 200. Java and all Java-based trademarks are trademarks of Sun Microsystems, Inc. in the United States, other countries, or both.

Instructions for the operating system, the object-oriented programming system, and applications or programs are located on storage devices, such as hard disk drive 226, and may be loaded into main memory 208 for execution by processing unit 206. The processes of the illustrative embodiments may be performed by processing unit 206 using computer implemented instructions, which may be located in a memory such as, for example, main memory 208, read only memory 224, or in one or more peripheral devices.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may be comprised of one or more buses, such as a system bus, an I/O bus and a PCI bus. Of course the bus system may be implemented using any type of communications fabric or architecture that provides for a transfer of data between different components or devices attached to the fabric or architecture. A communications unit may include one or more devices used to transmit and receive data, such as a modem or a network adapter. A memory may be, for example, main memory 208 or a cache such as found in north bridge and memory controller hub 202. A processing unit may include one or more processors or CPUs. The depicted examples in FIGS. 1-2 and above-described examples are not meant to imply architectural limitations. For example, data processing system 200 also may be a tablet computer, laptop computer, or telephone device in addition to taking the form of a PDA.

Generally, each time data needs to be transferred between the user and the operating system kernel, the data has to be copied into the kernel memory space and then copied out to the user memory space. This copy-in and copy-out process is performed because of exception handling for illegal addresses that can get passed from the user space to the kernel space. However, the copy-in and copy-out process consumes processor cycles and can lead to less efficient process utilization.

For example, when process or thread level profiling is performed, the processor cycles consumed during the copy-in and copy-out result in longer execution times for the processes and/or threads that are executing. These extra processor cycles can result in skewed profiling data. A user is then forced to use the skewed profiling data for profiling analysis.

The illustrative embodiments recognize that if the kernel saves data directly into the user space, the data can be corrupted or altered by user applications running in the user space. Therefore, the illustrative embodiments recognize the need for the kernel to be able to allocate pages that are trusted by the kernel, such as guard pages, in the user space. Thus, the illustrative embodiments also recognize that the kernel can write data directly into the trusted pages in the user space. Hence, no copy-in and copy-outs of data need to happen.

The illustrative embodiments provide a computer implemented method, apparatus, and computer usable program code for using trusted user space pages. In one embodiment, a set of trusted user space pages in a user space is accessed from the kernel space. The set of trusted user space pages have either read-only permission or no access permission in user mode. Each trusted user space page is set to be a readable and writeable page by the kernel. Data captured by the kernel is saved directly to the set of trusted user space pages.

A trusted user space page is used as the kernel to write data to pages in the user space and read data from pages in the user space that are secure from corruption by user applications and processes executing in the user space. In other words, the kernel can use trusted user space pages in the user space as if the trusted user space pages were pages located in the kernel space. As used herein, a set of trusted user space pages includes a single user space page, as well as two or more trusted user space pages.

In one embodiment, a trusted user space page is a guard page. In this example, a guard page in a user space is accessed by the kernel. The guard page is a read-only page in user mode. User mode allows multiple virtual systems, referred to as guests, to run as an application on a single piece of hardware. Each virtual system is an application running as a process in user space. A user can assign only the hardware and/or software access to a virtual system that the user wants the virtual system to have. User mode allows a user to limit access of each virtual system running on the same hardware machine, referred to as a host. Thus, a user can run multiple virtual systems on the host without changing or damaging the host machine's configuration or stability.

The process sets the guard page to be a readable and writeable page by the kernel. Data captured by the kernel is saved to the guard page. The guard page is used as a kernel data page by the kernel. A kernel includes any code, application, or task that is part of the kernel, a process of the kernel, a device driver, or a kernel extension. In other words, a kernel is any code executing in kernel space. Applications that can use this embodiment include but are not limited to profiling where the kernel can directly update the profiling data to trusted pages, and any other performance collection tools where the kernel can update the performance data directly on the user created trusted pages.

In another embodiment, each thread in multithreaded process is associated with a set of trusted user space pages. As used herein, a set of trusted user space pages associated with a given thread can include a single trusted user space page, as well as two or more trusted user space pages. The kernel writes profiling data for a given thread to the set of trusted user space pages associated with the given thread. In this manner, the kernel can read and write thread level profiling data to user space pages that are secure from corruption or alteration by user processes running in the user space.

Figure 3:
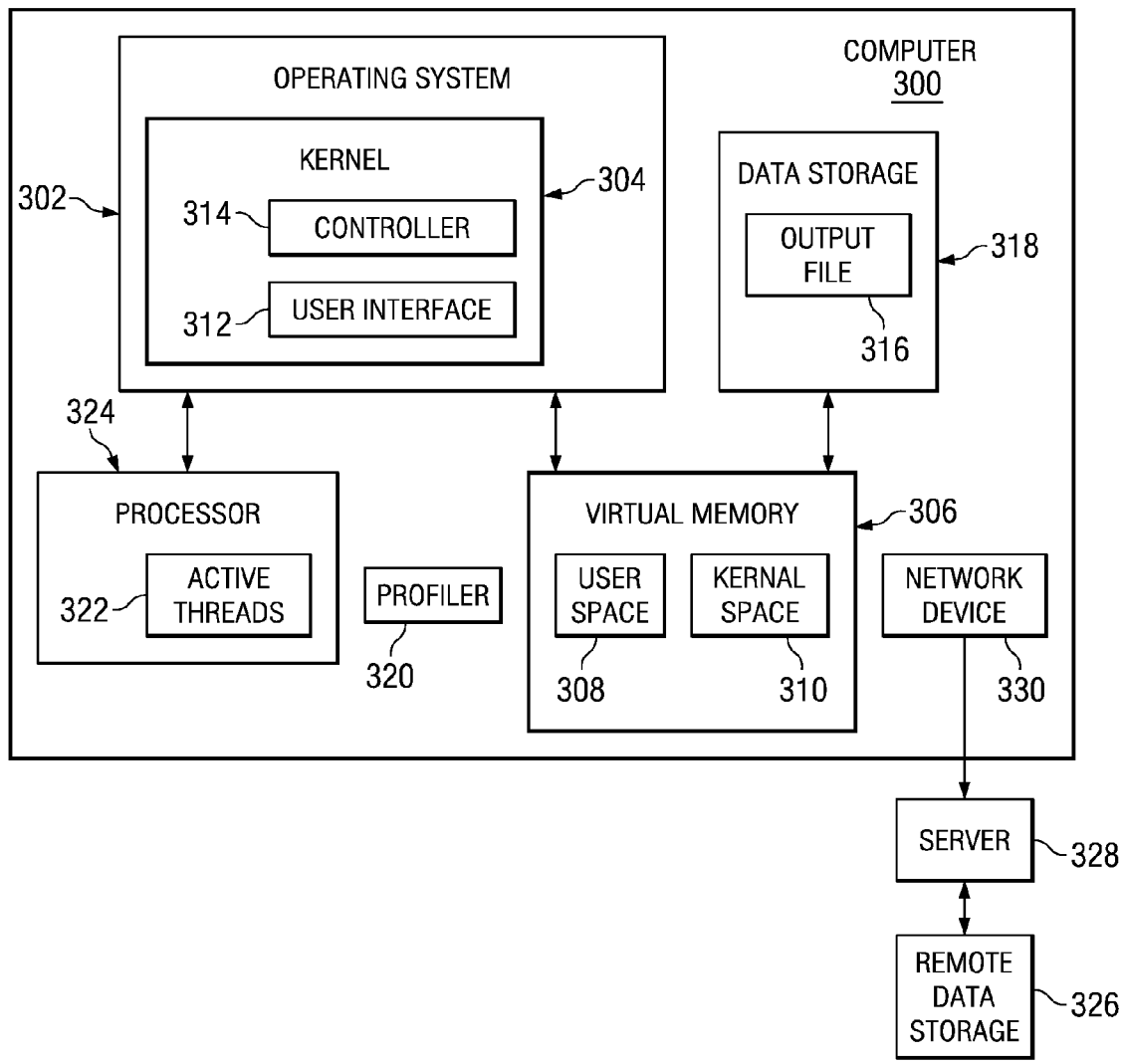
FIG. 3 is a block diagram illustrating a dataflow when a trusted user space page is used as a kernel space page in accordance with an illustrative embodiment.

FIG. 3 is a block diagram illustrating a dataflow when a trusted user space page is used as a kernel space page in accordance with an illustrative embodiment.

Computer 300 is any type of computing device, such as a personal computer, laptop, personal digital assistant, or any other computing device. For example, computer 300 can include any type of computing device depicted in FIGS. 1 and 2. Operating system 302 is a software program that manages the hardware and software of computer 300. Operating system 302 includes a collection of utility programs that drive most operations on computer 300.

Operating system 302 also includes kernel 304 that runs the programs. Kernel 304 manages computer system resources for computer 300, such as communications, processor(s), input/output (I/O) devices, and memory. In other words, kernel 304 connects the software and hardware of computer 300.

Kernel 304 manages memory on computer 300, including virtual memory 306. Virtual memory 306 is a memory addressing technique in paged memory systems where the operating system presents noncontiguous memory to software as contiguous memory. Kernel 304 divides virtual memory into user space 308 and kernel space 310. User space 308 is a set of memory locations in which user processes and user applications run. A process is an executing instance of an application. A process can include multiple threads, such as in a multithread application.

A user application in user space 308 cannot access kernel space 310 directly. Kernel space 310 can ordinarily only be accessed by a user process through the use of system calls. Kernel space 310 is the set of memory locations in which kernel 304 executes. In other words, kernel space 310 is reserved for running kernel 304. User interface 312 is a software component for setting up trusted pages in the user space for use by the kernel. A trusted page is a page that is readable and writable by the kernel but is read-only or no access permission in user mode. In other words, the trusted page is a user space page, but the trusted page is secure from corruption by user applications. Trusted pages include, but are not limited to, guard pages. Thus, the kernel can directly manipulate the trusted pages in user space and be certain of the integrity of the trusted pages.

Controller 314 is a software component for allocating trusted user space pages to kernel 304 for use as kernel data pages. Controller 314 writes out data generated as a result of executing code by kernel 304 to output file 316 in data storage 318.

Data storage 318 is any type of data storage device for storing information, such as storage 108 in FIG. 1. Data storage 318 includes, but is not limited to, a database, a file system, a hard disk, a flash memory, and/or any other known or available data storage devices.

Thus, in this illustrative example, user interface 312 sets up a set of trusted pages in user space 308 for utilization by kernel 304. Kernel 304 gathers data and/or receives data.

Kernel 304 writes the data directly into the trusted page, thereby utilizing the trusted page in the user space as if it were a kernel page in the kernel space. When the process exits, kernel 304 does not need to write or copy data to the user space for utilization by user applications, because the data is already available in the user space. The trusted page is read-only in the user level, therefore, user applications are able to read the data stored there, but the user applications cannot corrupt or alter the data.

Trusted pages are protected in user mode. Trusted pages are set up to have read-only permission or no-access permission in user mode. After execution of the process is complete, the trusted pages' permissions are changed to read-only permissions at the user level so that the user and/or applications in the user space can retrieve all the data written into the trusted pages by the kernel.

Kernel 304 can utilize trusted pages for any situation in which data needs to be transferred between the user and the kernel. For example, profiling data generally needs to be transferred between kernel 304 and user for profiling of processes and/or threads. In this example, profiler 320 is a software component for analyzing profiling data on a per process basis or a per thread basis to generate profiles and call graphs. In this illustrative example, profiler 320 analyzes profiling data to generate profiles and call graphs on a per thread basis. In other words, profiler 320 generates data regarding the execution of each thread in active threads 322 executing on processor 324. The permissions for the trusted pages are changed to read-only at the user level after the kernel part of the thread or process at 304 execution is complete so that user applications, can retrieve all the profiling data written into the trusted pages by kernel 304.

Processor 324 is a processor, such as processor unit 206 in FIG. 2. Processor 324 is any type of known or available processor for executing a process on computer 300, including but not limited to, a central processing unit (CPU) or a digital signal processor (DSP).

In this example, kernel 304 gathers profiling data during execution of active threads 322. Active threads 322 include one or more threads executing on processor 324. Kernel 304 writes the profiling data to a trusted page in user space 308. Profiler 320 reads profiling data out of user space 308 and generates profiles and call graphs for active threads 322 as a process associated with active threads 322 is executing on processor 324. Thus, profiler 320 can output profile analysis results without waiting for the entire process to complete execution. When each thread in active threads 322 exits, the profiling data associated with the exiting thread is written out to output file 316. The profiling data is written to an output file as each thread exits, rather than waiting for the entire process to exit. In this manner, memory space is conserved.

When profiling data is written to an output file, controller 314 un-protects or changes access permissions for the guard page. In this example, the guard page is un-protected by an application program interface (API) exported to the user by the kernel. The application program interface sets a flag in the guard page to change the protection status. In other words, the guard page is no longer set to be no-access or read-only in the user space. Controller 314 then writes out the contents of the guard page to the output file.

In this example, output file 316 is stored on a local data storage device. Output file 316 is any type of known or available file in a data storage device, including but not limited to, a file system or a database. However, in accordance with another illustrative example, output file 316 can also be stored on remote data storage device 326. Remote data storage 326 is any type of data storage for storing a collection of data that is not located on computer 300. In this illustrative example, remote data storage 326 is located on server 328.

Server 328 is any type of server, such as server 104 and 106 in FIG. 1. Server 328 can be a server on a network, such as network 102 described in FIG. 1. Computer 300 accesses remote data storage 326 on server 328 through a network connection via network device 330.

Network device 330 is any type of network access software known or available for allowing computer 300 to access a network. Network device 330 connects to a network connection, such as network 102 in FIG. 1. The network connection permits access to any type of network, such as a local area network (LAN), a wide area network (WAN), or the Internet.

Figure 4:
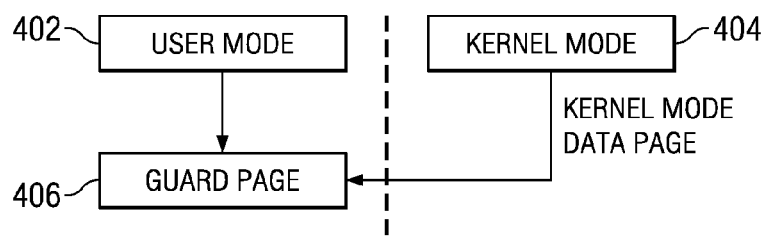
FIG. 4 is a block diagram illustrating a kernel using a guard page in a user space as a kernel space data page in accordance with an illustrative embodiment.

Turning now to FIG. 4, a block diagram illustrating a kernel using a guard page in a user space as a kernel space data page is depicted in accordance with an illustrative embodiment. In this example, user mode 402 is a user space, such as user space 308 in FIG. 3. Kernel mode 404 is a kernel space in virtual memory, such as kernel space 310 in FIG. 3.

Guard page 406 is an unmapped memory page placed between all memory allocations of one page or larger in heap memory. Guard pages, such as guard page 406, are allocated to prevent threads from overflowing their memory stack and overwriting other memory in the computer system. Thus, guard page 406 prevents heap buffer overflows.

Guard pages remain as unused memory segments in the computer system. Thus, guard page 406 is a trusted user space for the kernel because user space processes cannot write to guard page 406. If a user space process attempts to access an address within guard page 406, the computer system raises an exception, such as a segmentation fault. Thus, guard page 406 is a trusted page in user space for use by the kernel.

For example, in thread-level profiling, a thread structure is created and a stack is allocated for every thread. If the user specifies a guard page, a guard page is also allocated with every thread structure. A guard page is allocated to each thread to prevent the thread from overflowing the thread's memory stack. Currently, these guard pages remain unused. An example of a thread structure is a pthread structure.

In accordance with this illustrative embodiment, enough guard pages are allocated to each thread to hold complete profiling data for each thread. During process initialization, a size for each guard page is determined. A size for a guard page is determined based on the size of the executable, the scaling factor, and alignment to page size factor. The determined size of the guard page is the size of the guard page that will be allocated with the thread structure and stack for each new thread that is created. In this manner, memory that would otherwise be wasted is reused. Thus, memory consumption for every thread is likewise reduced.

The kernel is set so that the kernel can utilize the guard pages for writing profiling data to the guard pages. This is accomplished by providing the kernel with memory addresses for guard page 406 in user mode 402. The kernel then stores the profiling data in guard page 406.

Figure 5:
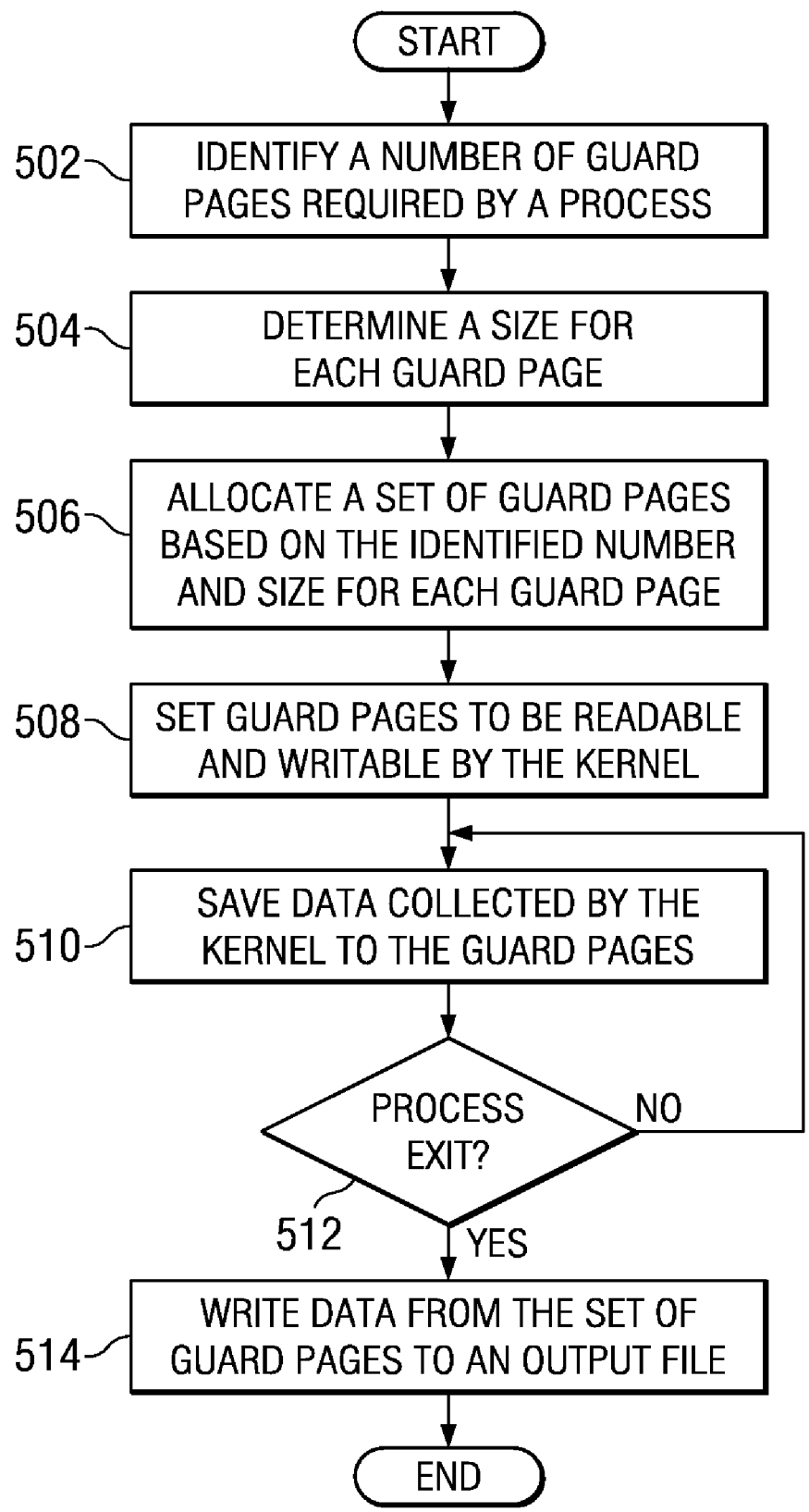
FIG. 5 is a flowchart illustrating a process for using a guard page as a kernel space data page in accordance with an illustrative embodiment.

FIG. 5 is a flowchart illustrating a process for using a guard page as a kernel space data page in accordance with an illustrative embodiment. In this illustrative example shown in FIG. 5, the process is performed by a software component for using trusted user space pages as kernel data pages, such as controller 314 in FIG. 3.

The controller begins by identifying a number of guard pages required by a process (step 502). This step occurs during load time. The controller determines the memory requirements for a given process, and identifies a number of guard pages based on the memory requirements. In another embodiment, a user defines the number of guard pages.

The controller determines a size for each guard page (step 504). A guard page can vary in size. A guard page can be as little as one page (generally four kilobytes (4K) in size. The upper limit is determined by the page size that is supported by the kernel.

In this example, controller determines a size for each page based on memory requirements for a process and/or a thread. In another illustrative example, a size for a guard page is a user defined size. In other words, a user can select a size for each guard page and a number of guard pages to be allocated for use by the kernel.

The controller allocates a set of guard pages based on the identified number of guard pages and the size of each guard page required by the process (step 506). As used herein, a set of guard pages can include a single guard page, as well as two or more guard pages.

The controller sets each guard page to be readable and writable by the kernel (step 508). The controller saves data generated by the kernel to the set of guard pages (step 510). The controller makes a determination as to whether the process is ready to exit (step 512). If the process is not ready to exit, the controller returns to step 510 and continues saving data collected by the kernel to the guard pages. If the process is ready to exit, the controller writes data from the set of guard pages to an output file before the process exits (step 514).

In this example, the process can include any process in which a kernel reads and/or writes data to a user space page that is secure from corruption by user applications such that the kernel can trust that data written to or read from the user space page is secure. For example, the process shown in this example can include a process level profiler.

In this illustrative embodiment, the controller writes data to an output file before the process exits or at the time the process exits. However, in accordance with another illustrative embodiment, data is written out from a single guard page when a thread associated with the guard page exits. In other words, even if a process associated with the thread has not exited, the data stored in a guard page associated with the thread is written out of the guard page and to an output file when the thread exits.

Data is written out to an output file as each thread exits. This is accomplished by writing out a profile file header and executable map for each thread at application start up. In other words, when the multithread process is set up for execution, a profile data file header and executable map is written out to an output file for each thread. The header contains the size of the profile data and the size of the call graph data that is going to be written for each thread, the thread ID, and a file or pointer that points to the offset of the next thread's profiled data. This will ensure that the individual thread data are separated out. Thus, as each thread completes execution and exits, the profile data for that thread can be written out to the output file based on the header and executable map for the multithread process. This will ensure we are not using allocated heap memory to hold data for threads that have already exited and reduce the amount of memory that is used to hold the profiling data for threads.

Figure 6:
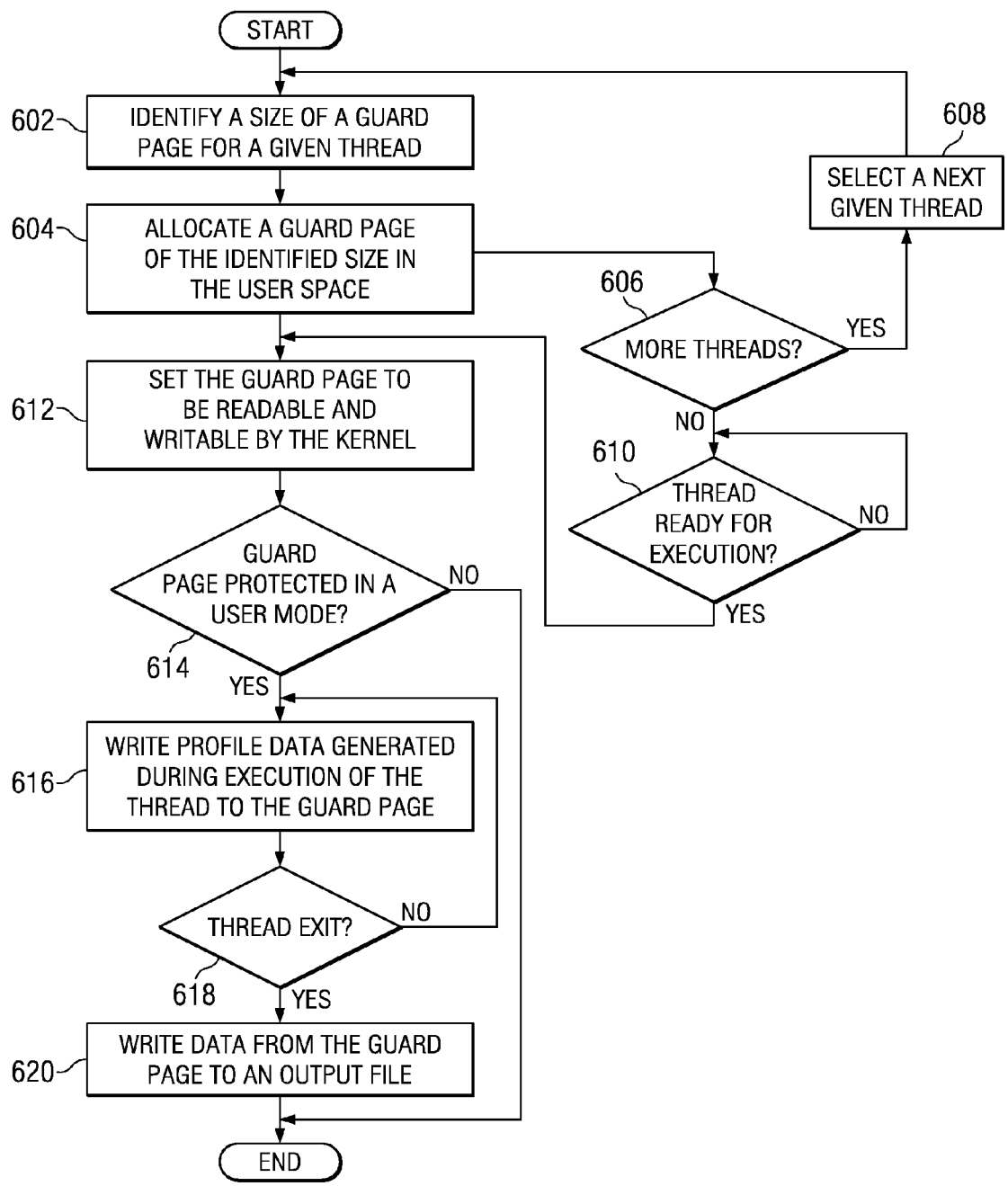
FIG. 6 is a flowchart illustrating a process for per-thread profiling using trusted user space pages as kernel data pages in accordance with an illustrative embodiment.

Referring now to FIG. 6, a flowchart illustrating a process for per-thread profiling using trusted user space pages as kernel data pages is shown in accordance with an illustrative embodiment. In this illustrative example shown in FIG. 6, the process is performed by a software component for using trusted user space pages as kernel data pages, such as controller 314 in FIG. 3.

The process begins by a controller identifying the number of guard pages for each thread that is going to be profiled (step 602). The controller identifies the number of guard pages based on the memory requirements for the thread. The controller allocates the identified number of guard pages in the user space (step 604). The controller makes a determination as to whether more threads need guard pages allocated (step 606). Responsive to a determination that one or more threads need a guard page allocated to the thread, the controller selects a next given thread (step 608) and iteratively continues allocating an identified number of guard pages for each thread until guard pages have been allocated for every thread.

The controller makes a determination as to whether a thread is ready to execute (step 610). When a thread is ready to execute, the controller sets the guard page to be readable and writable by the kernel (step 612). Guard pages are setup by the controller such that they are readable and writeable by the kernel and are protected in the user mode at the time of thread creation (step 614). The kernel writes profile data generated during execution of the given thread to the guard page associated with the given thread (step 616).

The controller then makes a determination as to whether the thread has exited (step 618). If the thread has not exited, the controller continues writing profile data to the guard page until the thread exits. When the thread exits, the controller writes the profile data for the given thread from the guard page associated with the given thread to an output file (step 620) with the process terminating thereafter. When the thread exits, the controller writes a header for the thread to the output file.

Thus, the illustrative embodiments provide a computer implemented method, apparatus, and computer usable program code for using trusted user space pages as kernel space pages. A kernel accesses a set of trusted user space pages in a user space. The set of trusted user space pages are read-only pages in a user mode. Each trusted user space page in the set of trusted user space pages is set to be a readable and writeable page by the kernel. Data captured by the kernel is saved directly to a trusted user space page in the set of trusted user space pages. Data is also read directly from the set of trusted user space pages by the kernel. The set of trusted user space pages are secure from corruption by user processes running in the user space. In other words, the trusted user space page is used by the kernel as if the trusted user space page was a secure page located in the kernel space, when in fact, the trusted user space page is a page located in the user space.

In one embodiment, a trusted user space page is a guard page. In this example, a guard page in a user space is set to be accessible by the kernel space. The guard page is a read-only page in a user mode. The guard page is set to be a readable and writeable page by the kernel. Data captured by the kernel is saved to the guard page. The guard page is used as a kernel data page by the kernel.

The illustrative embodiments permit reuse of guard pages that are allocated to every thread in a multithreaded process. In the user space, guard pages are protected by prot_none. When guard pages are protected to have no access permissions in user mode, prot_none is the flag value that is used to set the guard page to deny access permissions in user mode. In this illustrative example, prot_none is a flag to control access permission in user mode on an Advanced Interactive Executive (AIX®) operating system.

When the thread is active and executing, profiling data can be written to by the kernel. In other words, guard pages, which are protected in the user space, are set to be readable and writeable in the kernel space. In this manner, user code is not able to corrupt the profiling data. As a result, the kernel need not be concerned with protecting and un-protecting the data stored in guard pages.

In addition, the illustrative embodiments reuse guard pages that would otherwise be wasted memory space. Reusing guard pages also reduces the memory consumption for each thread. Also, the amount of memory used to hold profiling data for threads that have already exited is reduced because profiling data is written out of user space to an output file as each thread exits.

This implementation also solves the problem of the same profiling buffer being used when thread ids are reused. The profile buffer is only active as long as the thread is active in memory. In this example, the profile data reader can do these checks for thread ID reuse and take appropriate actions. Profiling data is specific to threads and associated with a thread ID. The profile data reader is able to get different data for each instance of a thread running with a particular thread ID. The profile reader will give the consolidated profiling data for each thread ID based on the unique thread IDs.

Moreover, because profiling data for every thread is written out at thread exit and not at process exit, there will be no performance hit during the exit routine. In other words, the processor will not become overwhelmed by a large amount of profiling data to be written out when the process exits because the profiling data is periodically being written as each thread exits rather than waiting to write all the profiling data out at one time when the process exits.

The flowchart and block diagrams in the figures illustrate the architecture, functionality, and operation of possible implementations of systems, methods and computer program products according to various embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems, and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for using trusted user space pages, the computer implemented method comprising:
   accessing a set of trusted user space pages in a user space by a kernel, wherein a trusted user space page is a read-only page in a user mode;
   setting each trusted user space page in the set of trusted user space pages to be a readable and writeable page by the kernel; and
   saving data captured by the kernel directly to a trusted user space page in the set of trusted user space pages.

2. The computer implemented method of claim 1 wherein the kernel comprises a thread level profiler, and wherein the accessing step further comprises:
   associating each trusted user space page in the set of trusted user space pages with a thread in a multithreaded process.

3. The computer implemented method of claim 2 wherein the saving step further comprises:
   saving profiling data for each thread to the trusted user space page associated with each thread.

4. The computer implemented method of claim 2 further comprising:
   writing a set of profiling data for a given thread to an output file when the given thread exits.

5. The computer implemented method of claim 4 wherein writing a set of profiling data for a given thread to an output file further comprises:
   writing a header for the given thread to the output file;
   setting the trusted user space page associated with the thread to be readable and writeable in the user mode; and
   writing out the contents of the trusted user space page associated with the given thread to the output file.

6. The computer implemented method of claim 1 wherein the set of trusted user space pages comprises a user-defined number of trusted user space pages.

7. The computer implemented method of claim 1 wherein accessing the set of trusted user space pages further comprises:
   determining a size of each trusted user space page in the set of trusted user space pages based on an estimated amount of memory space required by each thread.

8. The computer implemented method of claim 1 wherein a trusted user space page is a guard page.

9. The computer implemented method of claim 1 wherein each trusted user space page has a no-access permission in user mode.

10. The computer implemented method of claim 1 wherein the set of trusted user space pages are used by the kernel to write data directly to the user space and read data directly from the user space.

11. A computer program product comprising:
   a computer usable medium including computer usable program code for using trusted user space pages as kernel space pages, said computer program product comprising:
   computer usable program code for accessing a set of trusted user space pages in a user space by a kernel, wherein a trusted user space page is a read-only page in a user mode;
   computer usable program code for setting each trusted user space page in the set of trusted user space pages to be a readable and writeable page by the kernel; and
   computer usable program code for saving data captured by the kernel directly to a trusted user space page in the set of trusted user space pages.

12. The computer program product of claim 11 wherein the kernel is a thread level profiler, and further comprising:
   computer usable program code for associating each trusted user space page in the set of trusted user space pages with a given thread in a multithreaded process.

13. The computer program product of claim 12 further comprising:
   computer usable program code for writing the profiling data for the given thread to an output file when the given thread exits.

14. The computer program product of claim 13 further comprising:
   computer usable program code for writing a header for the given thread to the output file;
   computer usable program code for setting the set of trusted user space pages associated with the given thread to be readable and writeable in the kernel mode; and
   computer usable program code for writing out the contents of the set of trusted user space pages associated with the given thread to the output file.

15. The computer program product of claim 11 further comprising:
   computer usable program code for saving profiling data for a given thread to a set of trusted user space pages associated with the given thread.

16. The computer program product of claim 11 wherein a trusted user space page is a guard page.

17. A system for using trusted user space pages as kernel space pages, the system comprising:
   a kernel, wherein the kernel accesses a set of trusted user space pages in a user space, and wherein a trusted user space page is a read-only page in a user mode;
   a controller, wherein the controller sets each trusted user space page in the set of trusted user space pages to be readable and writeable by the kernel; and
   wherein the controller saves data captured by the kernel directly to a trusted user space page in the set of trusted user space pages.

18. The system of claim 17 wherein the kernel includes a thread level profiler, and wherein the controller allocates a trusted user space page to a given thread in a multithreaded process and saves a set of profiling data in the trusted user space page for the given thread to an output file when the given thread exits.

19. The system of claim 17 wherein a trusted user space page is a guard page.

\* \* \* \* \*